United States Patent
Alker

[15] 3,663,954
[45] May 16, 1972

[54] SYSTEM FOR MEASURING HIGHER ORDER NONLINEARITIES OF A SIGNAL/TRANSMITTING NETWORK

[72] Inventor: Dietrich-Ekkehard Alker, Eningen, Germany

[73] Assignees: Wandel & Goltermann, Reutlingen; Franz-Josef Landwehr, Munster, Germany, part interst to each

[22] Filed: July 10, 1970

[21] Appl. No.: 53,948

[30] Foreign Application Priority Data

July 11, 1969 Germany.....................P 10 35 205.7

[52] U.S. Cl. .......................................................324/57 R
[51] Int. Cl. ..............................................................G01n 27/00
[58] Field of Search....................................................324/57

[56] References Cited

UNITED STATES PATENTS 2,337,541   12/1943   Burgess...................................324/57

*Primary Examiner*—Edward E. Kubasiewicz
*Attorney*—Karl F. Ross

[57] ABSTRACT

The output of a random-noise generator is modulated with the aid of two fixed reference frequencies $G_1$, $G_2$ (one of which may be zero) to yield two mutually transposed but correlated noise bands overlapping in a frequency range which substantially coincides with a band of signal frequencies to be transmitted through a test circuit to be examined for second-order and third-order nonlinearities. With the sum or difference of any two correlated signal frequencies $f_i'$, $f_i''$ in the two noise bands equal to a primary beat frequency $F_1 = G_2 \pm G_1$, the amplitude of a signal of this beat frequency in the output of the test circuit receiving the two wholly or partly coincident noise bands is a measure of second-order nonlinearity of that test circuit throughout the signal band. The superposition of a pilot oscillation of frequency $G_3$ (lying within the pass band of the test circuit) upon the primary beat frequency $F_1$ gives rise to a secondary beat frequency $F_2 = F_1 \pm G_3$ whereby the amplitude of another output signal, having this frequency $F_2$, is a measure of third-order nonlinearity of the test circuit.

4 Claims, 5 Drawing Figures

Patented May 16, 1972

Dietrich-Ekkehard Alker
INVENTOR.

BY Karl F. Ross

Attorney

Dietrich-Ekkehard Alker
INVENTOR.

BY Karl F. Ross
Attorney 3,663,954

SYSTEM FOR MEASURING HIGHER ORDER NONLINEARITIES OF A SIGNAL/TRANSMITTING NETWORK

My present invention relates to a system for measuring the nonlinearity of a signal-transmitting network or other test circuit designed to pass a predetermined frequency band.

The linearity of transmission of such circuits (e.g. cables, radio beams, amplifiers, speakers, waveguides and the like) is essential in order to prevent signal distortion and, in the case of a multichannel transmission path, to minimize crosstalk. To determine the presence or absence of nonlinearity, therefore, various systems have been developed. Generally the conventional technique comprises the concurrent transmission of two sine waves through the test circuit so that any nonlinearity present therein gives rise to intermodulation products or beat frequencies whose amplitudes are a measure of the degree of non-linearity present in a particular region of the signal band. Even if several harmonics of a first sine wave are thus interacted with a second sine wave to that several beat frequencies fall within the signal band, this system enables exploration of only isolated regions of that band.

It has also been proposed to transmit a spectrum of random frequencies, sometimes referred to as "white noise", through such a test circuit and to measure the distortions, if any, of these frequencies throughout the signal band. A drawback of this method is that the background noise originating within the system itself is superimposed upon the transmitted random frequency pattern so as to falsify the results of the measurements made. Since the entire frequency spectrum must be evaluated, it is not possible to reduce the noise level by selective filtering, as can be done with the technique first described.

In a commonly owned U.S. Pat. application, filed July 29, 1969 by Franz-Josef Landwehr under Ser. No. 845,738, there has been disclosed a linearity tester including a source of random frequencies, such as a generator of "white noise", spread over a predetermined test band whose width equals or exceeds that of a band of signal frequencies to be transmitted through a test circuit. The output of this source is fed to a modulating stage which includes a supply of at least one fixed reference frequency and which derives from the original test band a pair of two mutually transposed but at least partly overlapping correlated test bands, the region of overlap coinciding substantially with the signal band of the test circuit. Owing to the mode of generation of these correlated test bands, any given frequency in one test band has a counterpart in the other test band which, when additively or subtractively combined with the first frequency, yields a fixed beat frequency related to the reference frequency or frequencies supplied by the modulating stage. With two such reference frequencies, the beat frequency equals either the sum or the difference of these reference frequencies; if one reference frequency is suppressed (i.e. is made equal to zero), the beat frequency is identical with the remaining reference frequency.

Since this correlation of paired frequencies within the two mutually transposed test bands is true for all frequencies throughout the signal band, the magnitude of the beat frequency in the output of the test circuit is a cumulative measure of the nonlinearities existing within the band. Virtually all spurious frequencies due to inherent noise, including the products of intermodulation of noncorrelated components of the test bands, can be suppressed by highly selective filtering of this beat frequency.

The general object of my present invention is to provide an improved linearity tester of the above-described type adapted to detect higher-order nonlinearities, in particular third-order distortions resulting from intermodulation between primary modulation products and other components of the transmitted signal band.

A more specific object of this invention is to provide means in such a system for discriminating between second-order and third-order intermodulation products in the output of the tester.

In accordance with the present invention, I provide a generator of a pilot oscillation of a fixed frequency which is transmitted through the test circuit together with the band of random test frequencies and, like the primary beat frequency produced by second-order nonlinearities from the two reference frequencies as the sum or the difference thereof, lies within or close to that test band so as to fall within the pass band of the test circuit. Third-order nonlinearities of the test circuit then give rise to a secondary beat frequency, equal to the sum or the difference of the fixed pilot frequency and the primary beat frequency, which can also be selectively filtered out to provide a signal whose amplitude is a measure of the nonlinearity sought to be ascertained. Thus, by the alternate or concurrent detection of the two beat frequencies I can separately determine the distortions due to second-order and third-order nonlinearities.

With the pilot oscillation introduced into the signal path at a point beyond the modulation stage, its presence does not contribute to the amplitude of the output signal at the primary beat frequency so that the measurement of the second-order nonlinearities is not affected by that oscillation. Similarly, the suppression of the reference frequency or frequencies in the output of the modulating stage prevents any direct interaction between the reference and pilot frequencies. Thus, in a system using only one reference frequency (the other being zero), the primary beat frequency coincides with that reference frequency so that, if the latter were not suppressed, a part of the output signal at the secondary beat frequency would be due to intermodulation of the pilot frequency with the reference frequency rather than with the primary beat frequency, i.e. to nonlinearities of the first rather than the second order.

The above and other features of my invention will be described in greater detail hereinafter with reference to the accompanying drawing in which.

Figure 1:
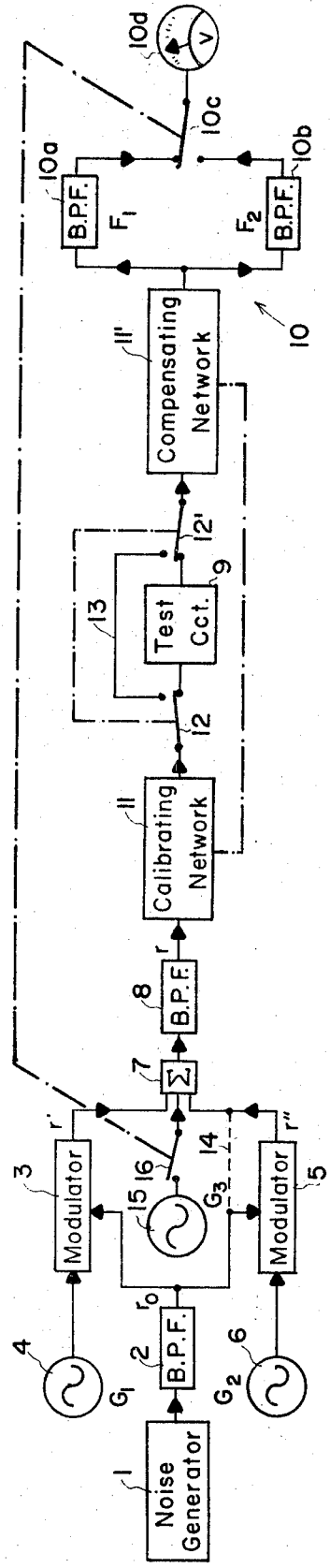
FIG. 1 is a block diagram of a system embodying my invention.

In FIG. 1 I have shown a system for the ascertainment of nonlinearity of a test circuit 9 which may be an impedance network or any other signal-transmission path. This system includes a source of random test frequencies, shown as a noise generator 1, whose output is limited by a band-pass filter 2 to produce a spectrum $r_o$ as shown in graph (a) of FIG. 2. Two local oscillators 4 and 6 generate a pair of reference frequencies $G_1$, $G_2$ which, as shown in the same graph, are separated by a difference frequency $\Delta G$ substantially smaller than the width of test band $r_o$: frequency $G_1$ lies just at the upper end of that band whereas frequency $G_2$ has a slightly higher value.

Figure 2:
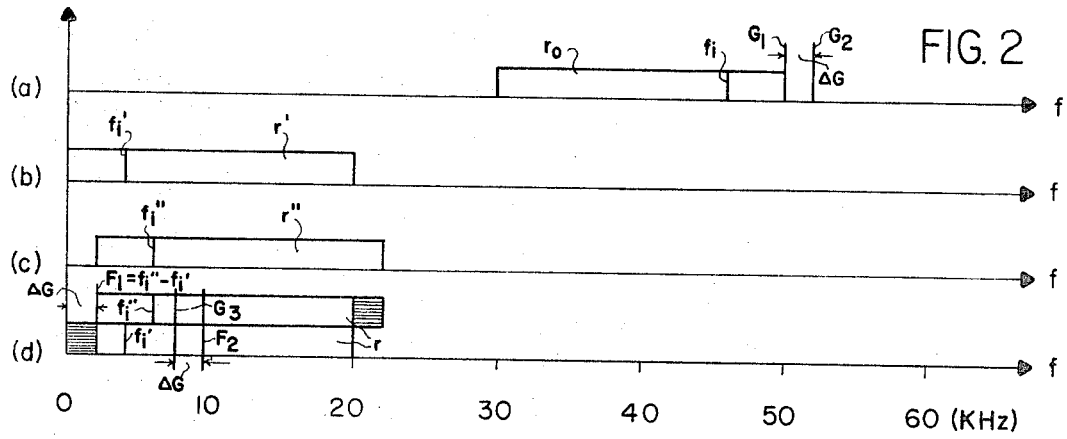
FIGS. 2 and 3 are two sets of graphs relating to the operation of the system of FIG. 1.

Two modulators or mixers 3 and 5 heterodyne the test band $r_o$, issuing from filter 2, with the frequencies $G_1$ and $G_2$, respectively, thereby giving rise to a pair of lower sidebands $r'$, $r''$ which have been illustrated in graphs (b) and (c) of FIG. 2 and which are linearly combined, as illustrated in graph (d) of that Figure, in a summing circuit 7. Another band-pass filter 8 in the output of the latter circuit clips the edges of the combined band to produce a composite test band $r$ which, it will be assumed, is coextensive with a signal band to be transmitted by the test circuit 9. An oscillator 15, generating a pilot oscillation of fixed frequency $G_3$, also feeds the summing circuit 7 through a switch 16 which is closed whenever it is desired to measure third-order nonlinearities. Frequency $G_3$ lies within the band of frequencies passed by the test circuit 9 though not necessarily within the noise-frequency band issuing from source 1.

The amplitude of the test band $r$ cleared by filter 8 can be adjusted with the aid of a calibrating network 11 in the input of test circuit 9, a compensating network 11' being connected in the output thereof. Reference is made to U.S. Pat. Nos. 3,461,385 and 3,486,112 for a calibrating system of this type.

Two switches 12 and 12', ganged for concurrent operation, serve to bypass the test object 9 during preliminary adjustment. The output of that test object, as modified in amplitude by the circuit 11', is delivered to a frequency analyzer 10 which could include an oscilloscope showing the entire signal band; as here specifically illustrated, this analyzer comprises two narrow-band filters 10a, 10b for selecting respective beat frequencies $F_1$, $F_2$, more fully discussed below with reference to graph (d) of FIG. 2, and a switch 10c for applying either of these beat frequencies to an indicator shown as a voltmeter 10d. Switches 16 and 10c may be ganged to supply the pilot frequency $G_3$ whenever filter 10b is connected in circuit.

Let us consider an arbitrary frequency $f_i$ forming part of a band $r_o$, e.g. a frequency of 46 kHz in a band ranging from 30 to 50 kHz. Upon modulation with frequency $G_1$ of 50 kHz, this band appears in inverted form in the range of 0 to 20 kHz; the selected arbitrary frequency is reproduced therein as a frequency $f_i' = G_1 - f_i = 4$ kHz. Modulation with frequency $G_2 = 52$ kHz yields the inverted band $r''$ in the range of 2 to 32 kHz, with the selected frequency $f_i'' = G_2 - f_i = 6$ kHz. With the two frequencies $f_i'$ and $f_i''$ interacting by reason of a second-order nonlinearity in the corresponding region of the pass band of test circuit 9, there results a difference frequency $F_1 = f_i'' - f_i' = G_2 - G_1$. Thus, the primary beat frequency $F_1$ shown in graph (d) of FIG. 2 has a value of 2 kHz which is independent of the magnitude of $f_i$, this beat frequency therefore combining the energies of the intermodulation products of all pairs of correlated noise frequencies in the bands $r'$ and $r''$. Frequencies $G_3$ and $F_2$ appear in graph (d) of FIG. 2 within the composite band $r$ and are separated by the difference frequency $\Delta G = F_1$.

Figure 3:
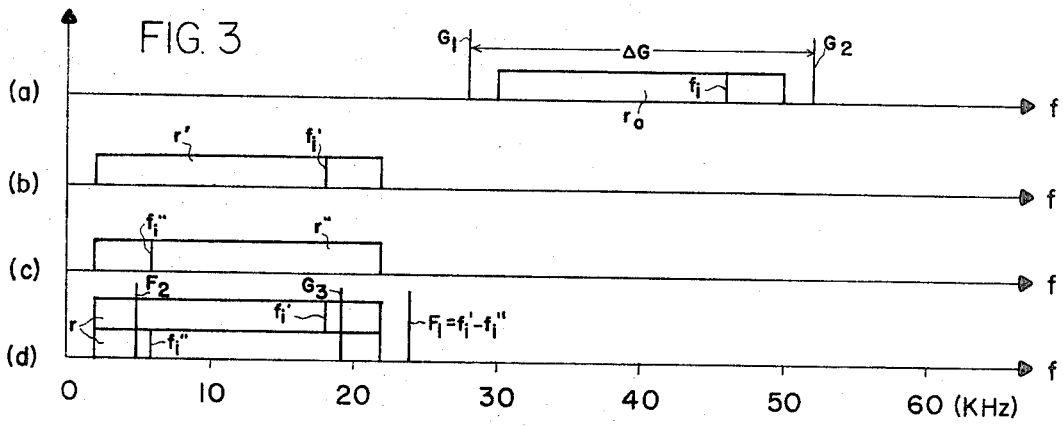

Graph (a) of FIG. 3 shows the two reference frequencies $G_1$ and $G_2$ positioned on opposite sides of the test band $r_o$, specifically at 28 and 52 kHz, respectively. The first transposed test band $r'$, graph (b), then lies in the range of 2 to 22 kHz without inversion, the frequency $f_i' = f_i - G_1$ being thus located at 18 kHz. The second band $r''$, graph (c) of FIG. 3, has the same position as in FIG. 2, again with $f_i'' = G_2 - f_i = 6$ kHz. The resulting primary beat frequency $F_1$, graph (d), is given by $F_1 = f_i' + f_i'' = G_2 - G_1 = 24$ kHz. With $F_2 = F_1 - G_3$, the positions of frequencies $F_2$ and $G_3$ within the transmitted band are interchangeable.

If oscillator 6 and modulator 5 were omitted, i.e. $G_2 = 0$, the output of filter 2 would have to be directly connected to one of the inputs of summing circuit 7 as indicated by the dotted line 14 in FIG. 1.

Figure 4:
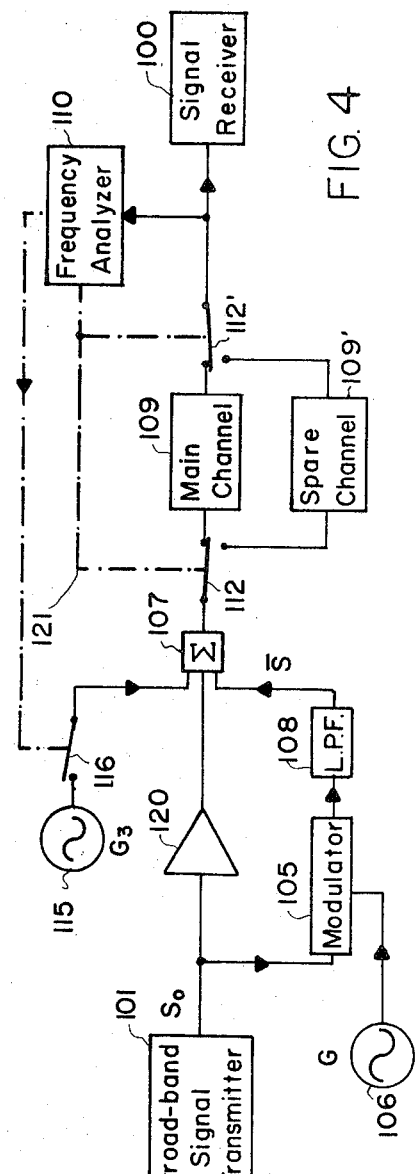
FIG. 4 is a diagram similar to FIG. 1, illustrating a modification.
Figure 5:
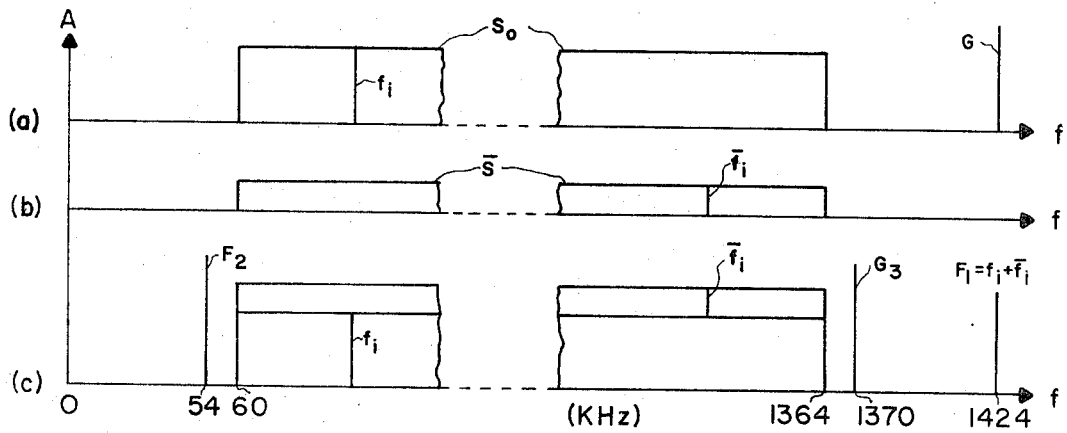
FIG. 5 is a set of graphs related to the system of FIG. 4.

In FIG. 4 I have shown a modified system in which a broadband signal transmitter 101 replaces the noise generator 1 of FIG. 1 as a source of random frequencies spread over a band $s_o$; see also graph (a) of FIG. 5. The band $s_o$ is fed through an amplifier 120 to a summing circuit 107 which also receives the output of a low-pass filter 108 fed by a modulator 105. This modulator heterodynes the signal band $s_o$ from transmitter 101 with a fixed reference frequency $G$ from a local oscillator 106, thereby producing an inverted signal band $\bar{s}$ shown in graph (b) of FIG. 5. With reference frequency $G$ separated from the upper limit of band $s_o$ by a spectral distance equal to the lower limit of that band, the transposed band $\bar{s}$ is coextensive with the original band $s_o$ while having a considerably smaller amplitude $A$. Pilot oscillation $G_3$ is fed to summing circuit 107 from a supply 115 through a switch 116. Graph (c) of FIG. 5 shows the resulting test band $s$, appearing in the output of summing circuit 107, which is fed to a main transmission channel 109, representing the circuit under test, via a switch 112 which is ganged with another switch 112' in the output of that channel. The message signals transmitted via channel 109 are delivered to a receiver 100 and, in parallel therewith, to a frequency analyzer 110 which may again be alternately tuned to the primary and secondary beat frequencies $F_1 = G$ and $F_2 = F_1 - G_3$ as described above with reference to FIG. 1. A connection 121 extending from analyzer 110 controls the switches 112 and 112' to replace the main channel 109 by a spare channel 109' whenever excessive distortion appears in the former, as determined by the nonlinearity tests continuously carried out by the analyzer 110. Naturally, this analyzer could also emit an audible or visual alarm signal attracting the attention of an operator in lieu of or in addition to switching the channels.

An arbitrarily selected frequency $f_i$ in band $s_o$ has a counterpart $\bar{f}_i = G - f_i$ in band $\bar{s}$. In this case $F_1 = f_i + \bar{f}_i = G$.

In the specific numerical example illustrated in FIG. 5, the original signal band $s_o$ and the composite band $s$ both range between 60 and 1,364 kHz, with $G = 1,424$ kHz and $G_3 = 1,370$ kHz whence $F_1 = 1,424$ kHz and $F_2 = 54$ kHz; as before, the frequencies $F_2$ and $G_3$ could be interchanged. Channel 109 is assumed to pass all these frequencies with about the same attenuation; filter 108 suppresses the frequency $G$ in the input of summing circuit 107 so that the frequency $F_2$ in the output of channel 109, when present in a continuous signal of more or less constant power, can be due only to intermodulation of frequencies $G_3$ and $F_1$.

I claim:

1. A system for determining the nonlinearity of a signal-transmitting circuit, comprising a source of random frequencies spread over a predetermined test band; a supply of at least one fixed reference frequency; modulating means connected to said supply and said source for deriving from the output of the latter a pair of two mutually transposed but at least partly overlapping correlated test bands within which any two correlated frequencies, derived from a common frequency in the original test band, give rise to a predetermined primary beat frequency upon intermodulation thereof in a nonlinear transmission path; summing means for combining said correlated test bands; supply means for delivering to said summing means a pilot oscillation whose fixed frequency is transmissible by a test circuit connected to said summing means for energization thereby; and frequency-selective indicator means connected to the output of said test circuit for ascertaining the amplitudes of a first output signal at said primary beat frequency and of a second output signal at a secondary beat frequency due to intermodulation of said primary beat frequency with said pilot oscillation.

2. A system as defined in claim 1 wherein said indicator means comprises separate indicator circuit for said first and second output signals and switchover means for alternately rendering said indicator circuit effective.

3. A system as defined in claim 2, further comprising switch means between said supply and said summing means for feeding said pilot oscillation to said summing means only during periods of effectiveness of the indicator detecting said second output frequency.

4. A system as defined in claim 1 wherein said modulating means includes filter means for suppressing said reference frequency in the input of said summing means.

* * * * *